O. HALLE.
EXPOSURE INDICATOR FOR PHOTOGRAPHIC PLATE HOLDERS.
APPLICATION FILED MAR. 11, 1909.
970,494.
Patented Sept. 20, 1910.
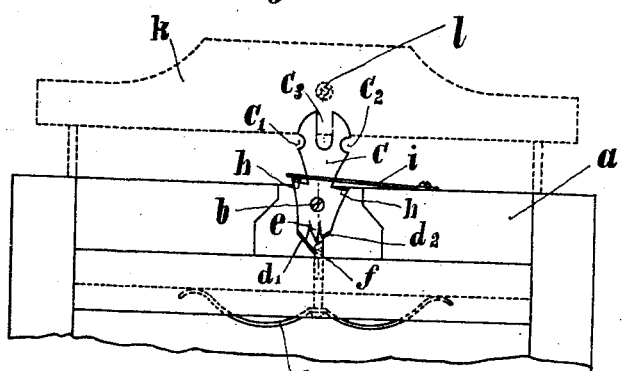
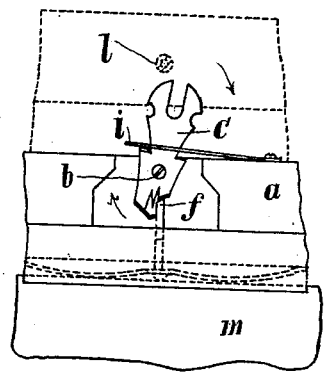
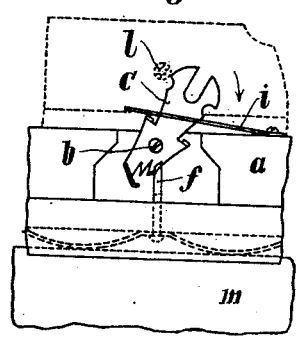
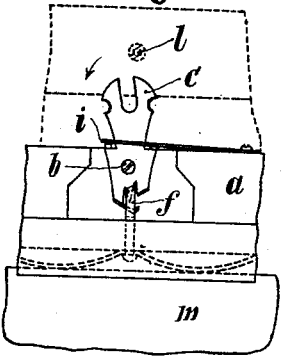
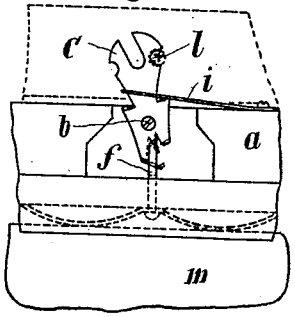
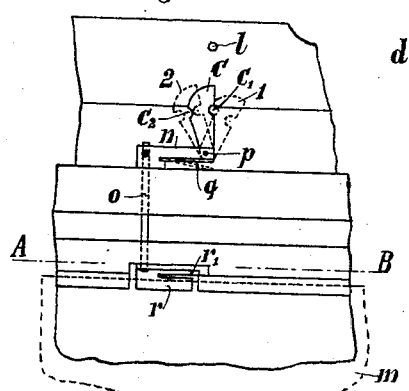
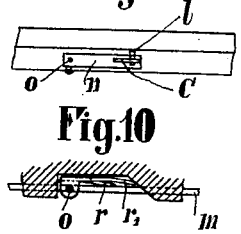
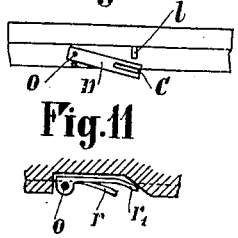
Witnesses:
Inventor:
Otto Halle
by B. Singer
Attorney.

UNITED STATES PATENT OFFICE.

OTTO HALLE, OF ORANIENBURG, GERMANY.

EXPOSURE-INDICATOR FOR PHOTOGRAPHIC-PLATE HOLDERS.

970,494.  Specification of Letters Patent. Patented Sept. 20, 1910.

Application filed March 11, 1909. Serial No. 482,766.

*To all whom it may concern:*

Be it known that I, OTTO HALLE, a subject of the King of Prussia, and residing at No. 4 Jahn street, Oranienburg, in the Kingdom of Prussia, Germany, have invented certain new and useful Improvements in Exposure-Indicators for Photographic-Plate Holders.

This invention relates to an appliance for use in connection with photographic plate-holders or dark-slides which indicates whether the plate-holder is empty, or whether it contains an unexposed or exposed plate.

The invention consists in the plate-holder being provided with a peculiar locking device, by means of which the shutter of the plate-holder is locked, when the plate-holder contains an exposed or an unexposed plate, and which adjusts itself automatically in such a way that a locking of the shutter is impossible when the plate-holder is empty.

The invention will now be more particularly described, reference being made to the accompanying drawings, in which several examples of construction are shown.

Figures 1–5 show views of a form of construction of the apparatus for solid plate-holders in different positions; Fig. 6 is a side view of parts of Fig. 1; Fig. 7 is a front view of a form of construction for folding plate-holders; Figs. 8 and 9 are plan views of the form of construction shown in Fig. 7 in different positions; while Figs. 10 and 11 are sections of Fig. 7 on the line A—B.

In the form of construction of the exposure indicator for solid plate-holders shown in Figs. 1–6 a locking member $c$ is pivotally mounted on a pin $b$ on the frame $a$ of the plate-holder, and is provided at one end with hooked notches $c^1$ $c^2$ and also a straight slot $c^3$. At the other end the locking member $c$ has outwardly projecting edges $d^1$ $d^2$, which are directed obliquely relative to one another and between which a tongue $e$ is located, the point of which faces a curved projection of the edge $d^1$, a clear space being left between it and the said edge $d^1$ so that the hooked end of a push bolt $f$ can pass laterally into this space. The push bolt $f$ is displaceably mounted in the frame $a$ and its end is connected with a strip spring $g$ arranged in the plate chamber, which bears on the inner face of the frame and tends to draw the push bolt into the frame and erect the locking member $c$ (Fig. 1).

The locking member $c$ is provided with two shoulders $h$, on which a spring $i$ bears in order to hold the locking member in a set condition and in a given position. A pin $l$ which is adapted to come into engagement with the notches or recesses $c^1$, $c^2$, $c^3$, of the locking member $c$ is mounted on the shutter $k$ of the plate-holder.

While Fig. 1 shows the position of the device when the plate-holder is empty, Figs. 2–5 show the positions when the plate-holder contains an unexposed plate, while Figs. 4 and 5 show the positions in which the locking member remains after the plate holder has been again opened for the purpose of the exposure.

The action of the device shown in Figs. 1 and 2 is as follows:—When the photographic plate $m$ is inserted in the chamber of the plate-holder, one edge bears against the strip spring $g$, which is compressed under the pressure of the plate and pushes the bolt $f$ outward. The end of the bolt $f$, which is diagonally shouldered, moves against the point of the tongue $e$ of the locking member $c$. By the pressure of the inclined surface of the bolt-end the member $c$ is tilted into the position, shown in Fig. 2, in which the end of the bolt $f$ comes in contact with the edge $d^2$ of the locking member $c$. When the plate $m$ is to be exposed, the locking member is released from the pin $l$, and the shutter is drawn out, the locking member automatically adjusting itself under the action of the spring $i$ into the position shown in Fig. 4, in which the slot $c^3$ assumes an inclined position and the edge of the locking member located above the recess $c^2$ comes into the path of the pin $l$, in such a way that on the shutter being pushed in after the exposure of the plate, the locking pin $l$ snaps automatically into the recess $c^2$ (Fig. 5). When the plate-holder is emptied, the spring $g$ is released, which draws back the bolt $f$ and allows it to slide along the curve of the edge $d^1$, whereby the locking member $c$ is erected and brought into the position shown in Fig. 1, in which the slot $c^3$ lies opposite the pin $l$, so that the pin must pass into the slot $c^3$ when the empty plate-holder is closed.

In the form of construction for folding plate-holders shown in Figs. 7–11, the locking member $c$ is only provided with the notches $c^1$ and $c^2$, the slot $c^3$ being omitted. The locking member $c$ is arranged on the arm $n$ of a shaft $o$ pivotally mounted in the frame of the plate holder. The locking member is pivotal on the arm $n$ on a pin $p$, and is under the pressure of a spring $q$, which tends to guide the locking member into the position shown in full lines. This position allows of the automatic engagement of the pin $l$ in the slot $c^2$ when the shutter is pushed into the plate-holder filled with an exposed plate. This position of engagement is shown in dotted lines at 1 (Fig. 7).

The shaft $o$ is firmly connected with an arm $r$ which is located in the chamber of the plate-holder and has a spring strip $r^1$, the end of which is adapted to bear on the frame of the plate-holder. In the position of repose the arm $r$ projects over the plate support and into the chamber of the plate-holder which receives the plate (Fig. 11), and the spring strip $r^1$ always tends not only to turn the arm $r$ into this position, but also thereby to turn the spindle $o$ and the arm $n$ in the same direction, so that the locking member $c$ is deflected out of the path of the locking pin $l$ of the shutter and an engagement of the latter with the locking member (Fig. 9) is rendered impossible. This position of the locking member $c$ is only possible when no plate is contained in the chamber of the plate-holder. If on the contrary the plate-holder be charged, the plate presses the arm $r$ back (Fig. 10), and causes the locking member to be rocked back into the path of the pin $l$ and it is possible for the pin to engage the locking member (Fig. 8).

The position of the locking member in which the pin $l$ engages in the slot $c^1$ represents the position of the plate-holder when charged with an unexposed plate. After the shutter of the plate holder has been opened for the purpose of exposing the plate, and has been closed again the pin $l$ slides over the edge above $c^2$ until it engages fully in the notch $c^2$. If then the plate-holder be opened and the plate removed therefrom, the strip spring $r^1$ presses the arm $r$ and with it the entire locking member out of reach of the pin $l$ into the position shown in Figs. 9 and 11, which represent the position of the device when the plate holder is empty.

Having now particularly described and ascertained the nature of the said invention and in what manner the same is to be performed, as communicated to me by my foreign correspondent, I declare that what I claim is:—

1. In an exposure indicator for plate-holders the combination of a spring controlled locking means for locking the shutter, and a locking member arranged on the shutter and coöperating with said locking means, with means arranged in the chamber of the plate-holder and adapted to be operated by the pressure of the plate inserted to operate said locking means so as to move it into and out of the path of said locking member.

2. In an exposure indicator for plate-holders the combination of a spring controlled locking means provided with two notches for locking the shutter, and a locking pin arranged on the shutter, with means arranged in the chamber of the plate holder and adapted to be operated by the pressure of the plate inserted to operate said locking means so as to move the notches into and out of the path of the locking pin.

3. In an exposure indicator for plate-holders the combination of a spring-controlled locking member provided with two notches for locking the shutter, and a locking pin arranged on the shutter and coöperating with said locking member, with a spring-operated rod projecting into the chamber of the plate-holder and adapted to be operated upon insertion of the plate and to move said locking member into the path of said locking pin in order to allow the engagement of said pin with said notches when the plate is inserted and upon removal of the plate from the plate-holder to move said notches out of the path of said pin.

4. In an exposure indicator for plate-holders the combination of a spring controlled locking means provided with two notches for locking the shutter, and a locking pin arranged on the shutter, with a spring-operated rod pivotally mounted in the frame and projecting into the chamber of the plate-holder and adapted to be operated upon insertion of the plate to move said locking means into the path of said locking pin in order to allow the engagement of said pin with the locking notches when the plate is inserted, upon removal of the plate from the plate-holder to move said locking means out of the engagement position.

In witness whereof I have hereunto set my hand in presence of two witnesses.

OTTO HALLE.

Witnesses:
　Woldemar Haupt,
　Henry Hasper.